United States Patent
Meserth et al.

(10) Patent No.: US 8,938,776 B2
(45) Date of Patent: *Jan. 20, 2015

(54) METHOD AND SYSTEM FOR USER DEFINED LOCAL STORAGE OF INFORMATION AND OBJECTS IN A VIRTUAL WORLD

(71) Applicant: International Business Machines Corporation, Armonk, NY (US)

(72) Inventors: Timothy A. Meserth, Durham, NC (US); Jeffrey J. Smith, Raleigh, NC (US); David T. Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,772

(22) Filed: Jun. 18, 2013

(65) Prior Publication Data

US 2013/0291120 A1 Oct. 31, 2013

Related U.S. Application Data

(63) Continuation of application No. 12/184,143, filed on Jul. 31, 2008, now Pat. No. 8,495,702.

(51) Int. Cl.
*H04L 29/06* (2006.01)
*G06F 21/62* (2013.01)
*G06F 21/60* (2013.01)

(52) U.S. Cl.
CPC .............. *H04L 63/10* (2013.01); *G06F 21/60* (2013.01); *G06F 21/6218* (2013.01)
USPC .......................................................... 726/1

(58) Field of Classification Search
None
See application file for complete search history.

(56) References Cited

U.S. PATENT DOCUMENTS

| | | | |
|---|---|---|---|
| 6,349,301 B1 | 2/2002 | Mitchell et al. | |
| 7,249,139 B2 | 7/2007 | Chuah et al. | |
| 2002/0133707 A1 | 9/2002 | Newcombe | |
| 2002/0174073 A1 | 11/2002 | Nordman et al. | |
| 2006/0026264 A1* | 2/2006 | Chesley et al. | 709/218 |
| 2006/0111186 A1 | 5/2006 | Hattori | |
| 2008/0262910 A1 | 10/2008 | Altberg et al. | |
| 2008/0280684 A1 | 11/2008 | McBride et al. | |
| 2009/0165140 A1 | 6/2009 | Robinson et al. | |

OTHER PUBLICATIONS

U.S. Non-Final Office Action for U.S. Appl. No. 12/184,143 mailed Oct. 6, 2011.
U.S. Final Office Action for U.S. Appl. No. 12/184,143 mailed Mar. 12, 2012.
U.S. Notice of Allowance for U.S. Appl. No. 12/184,143 mailed Apr. 1, 2013.

* cited by examiner

*Primary Examiner* — David Pearson
(74) *Attorney, Agent, or Firm* — Kenneth L. Sherman, Esq.; Michael Zarrabian, Esq.; Sherman & Zarrabian LLP

(57) ABSTRACT

The invention provides a method and system for securing information for a virtual world environment. The method includes creating information for a virtual world environment, transmitting the information to the virtual world environment from the memory, selectively removing the information from the virtual world environment, and selectively storing the information on a memory external to the server to prevent access from the server.

20 Claims, 4 Drawing Sheets

METHOD AND SYSTEM FOR USER DEFINED LOCAL STORAGE OF INFORMATION AND OBJECTS IN A VIRTUAL WORLD

CROSS-REFERENCE TO RELATED APPLICATIONS

This patent application is a continuation patent application of U.S. patent application Ser. No. 12/184,143 filed on Jul. 31, 2008, the disclosure of which is incorporated herein its entirety by reference.

BACKGROUND

1. Field of the Invention

The present invention relates generally to virtual world environments, and in particular to user defined local storage of information and objects in a virtual world environment.

2. Background Information

As internet based 3-D virtual worlds (VW) become more and more ubiquitous, individuals and businesses across a variety of industries are creating a presence in these worlds for many purposes including social networking, advertising and sales. Users of these VWs are able to create objects, services and a plurality of other business opportunities "in world" that could help the individual or company gain revenue, launch products or services, and provide customers with a rich information base for learning and buying opportunities.

In VWs, objects created are stored on the server and very often, if not always, visible to the VW hosts. This causes security concerns especially during pre-announced activities when prototypes are evaluated and compared in a virtual world. For a highly sensitive product or service, a VW user may feel uncomfortable allowing the VW provider to have access to items or information being developed in world, even in instances where the user is able to block other VW users from viewing or otherwise accessing the sensitive information.

SUMMARY

The invention provides a method and system for securing information for a virtual world environment. The method includes creating information for a virtual world environment, transmitting the information to the virtual world environment from the memory, selectively removing the information from the virtual world environment, and selectively storing the information on a memory external to the server to prevent access from the server.

Another embodiment involves a system for securing virtual world information. The system includes a virtual world server hosting a virtual world environment, and a client device configured to connect to the virtual world server. The client device includes an information creation module configured to create information for the virtual world environment, a memory configured to store the information, a transmit module configured to transmit the information to and from the virtual world environment, and a restore module configured to selectively restore the information to the virtual world environment.

Yet another embodiment involves a computer program product for securing virtual world information that causes a computer to create information for a virtual world environment, transmit the information to the virtual world environment from the memory, selectively remove the information from the virtual world environment, and selectively store the information on a memory external to the server to prevent access from the server.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of securing virtual world information, as well as operation and/or component parts thereof. While the following description will be described in terms of virtual world information storage for clarity and to place the invention in context, it should be kept in mind that the teachings herein may have broad application to all types of systems, devices and applications.

The invention provides a method and system for securing information for a virtual world environment. The method includes creating information for a virtual world environment, transmitting the information to the virtual world environment from the memory, selectively removing the information from the virtual world environment, and selectively storing the information on a memory external to the server to prevent access from the server.

Figure 1:
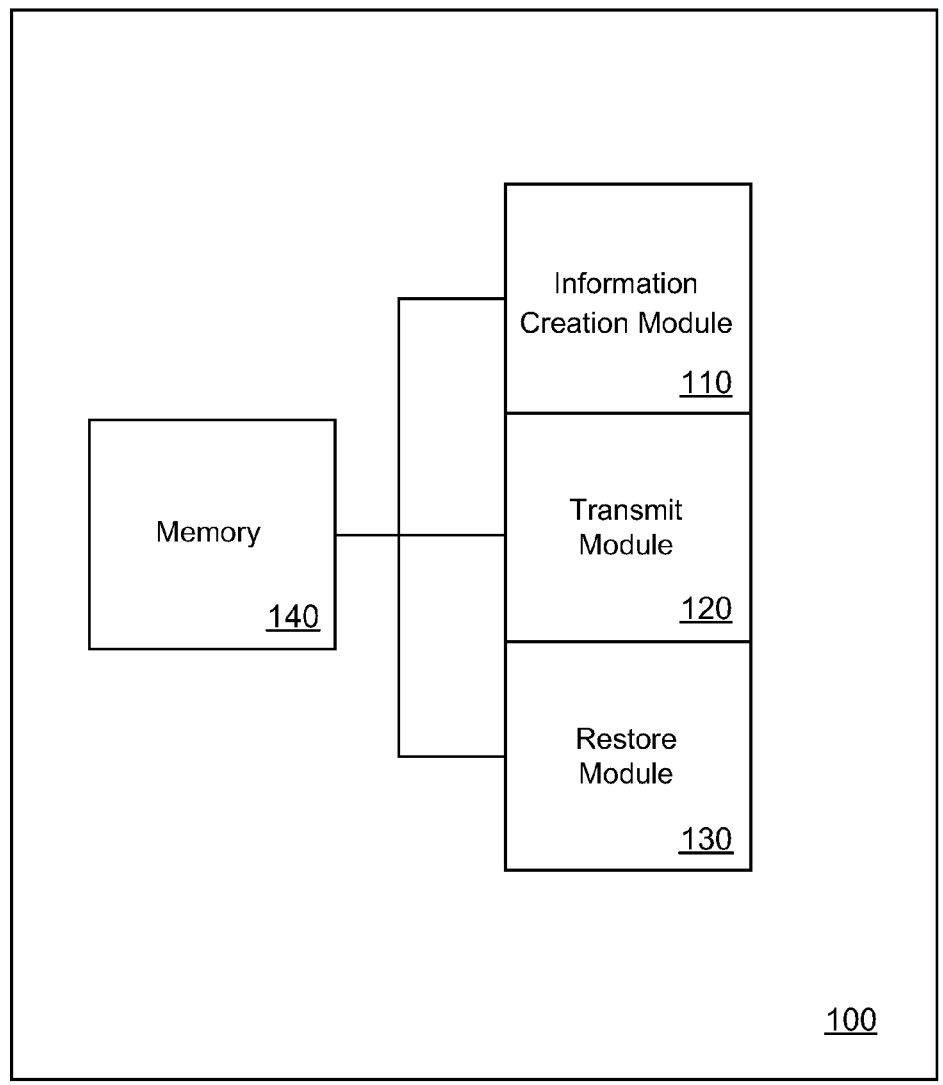
FIG. 1 illustrates a device for securing virtual world information according to one embodiment of the invention.

FIG. 1 illustrates a device 100 for securing virtual world environment information. In one embodiment, device 100 includes an information creation module 110, a transmit module 120, a restore module 130 and a memory 140. In one embodiment, virtual world environment information is stored in memory 140. Virtual world environment information is created either in the virtual world environment, through information creation module 110, or both. Virtual world information includes, but is not limited to, virtual world objects, history of user activity, visited pages, sign on logs, chat discussions, purchases, sales, private information, shared user information, emails, posts, discussions, favorite lists, friends lists, other avatar associated information, chat sessions, inventory, etc.

In one embodiment, when virtual world information is created by the information module 110, the information is stored locally on memory 140. When a user is ready to sign on to a virtual world environment to use the created information, transmit module 120 transmits or uploads the information to a virtual world environment running on a virtual world server.

In one embodiment, the virtual world environment gives a user a choice to select where information is to be stored. In this embodiment, the information can be stored locally on a memory 140, or on the virtual world server. In another embodiment, the user has the capability of directing the storage location of different portions of information. That is, a user may want to store some information on the virtual world server, and other information locally on memory 140.

In one embodiment, when a user signs off a virtual world environment, the user's selected virtual world information is removed from the virtual world environment and stored locally on memory 140. In one embodiment, in place of the virtual world information, tags are left when a user signs off. When the information is stored locally on memory 140, a host of the virtual world environment has no access to the information.

In one embodiment, restore module 130 restores information stored locally on memory 140 to the virtual world environment. A user selects the type of restoration through a menu, graphical user interface (GUI), etc. In one embodiment, restore module 130 restores information to the virtual world environment upon the user logging on to the virtual world environment. In another embodiment, the information is restored upon an avatar of a user becoming proximal to a location where information for an object or a service is to be restored in the virtual world environment. In one embodiment where a tag is left for the information to be restored, the tag is activated when a user reaches a grid location within a predetermined distance to the tag.

In another embodiment, the restore module 130 restores information to the virtual world environment manually upon logging in to the virtual world environment. In yet another embodiment, the restore module 130 restores information to the virtual world environment based on a predefined time. For example, if a user has planned a launch on a specific date at a specific time, the user can keep the information off the virtual world environment until the predetermined date and time.

In one embodiment, the user can group information for restoration. In this embodiment, the user selects how to group information. This selected grouping can be any type of grouping. For example, the user can select to group information by a creation date, a period of time since the creation date (e.g., one month, 6 months, etc.), semantic meaning of the information, type of information, information related to a specific topic, theme, product, service, etc. In this embodiment, the other restore embodiments discussed above can also be applied to the grouped information.

In one embodiment, information module 110, transmit module 120 and restore module 130 are part of a software toolkit that can be loaded on a user's computing device. In this embodiment, manual or automatic updates are made in order to remain compatible with changing virtual world environments.

Figure 2:
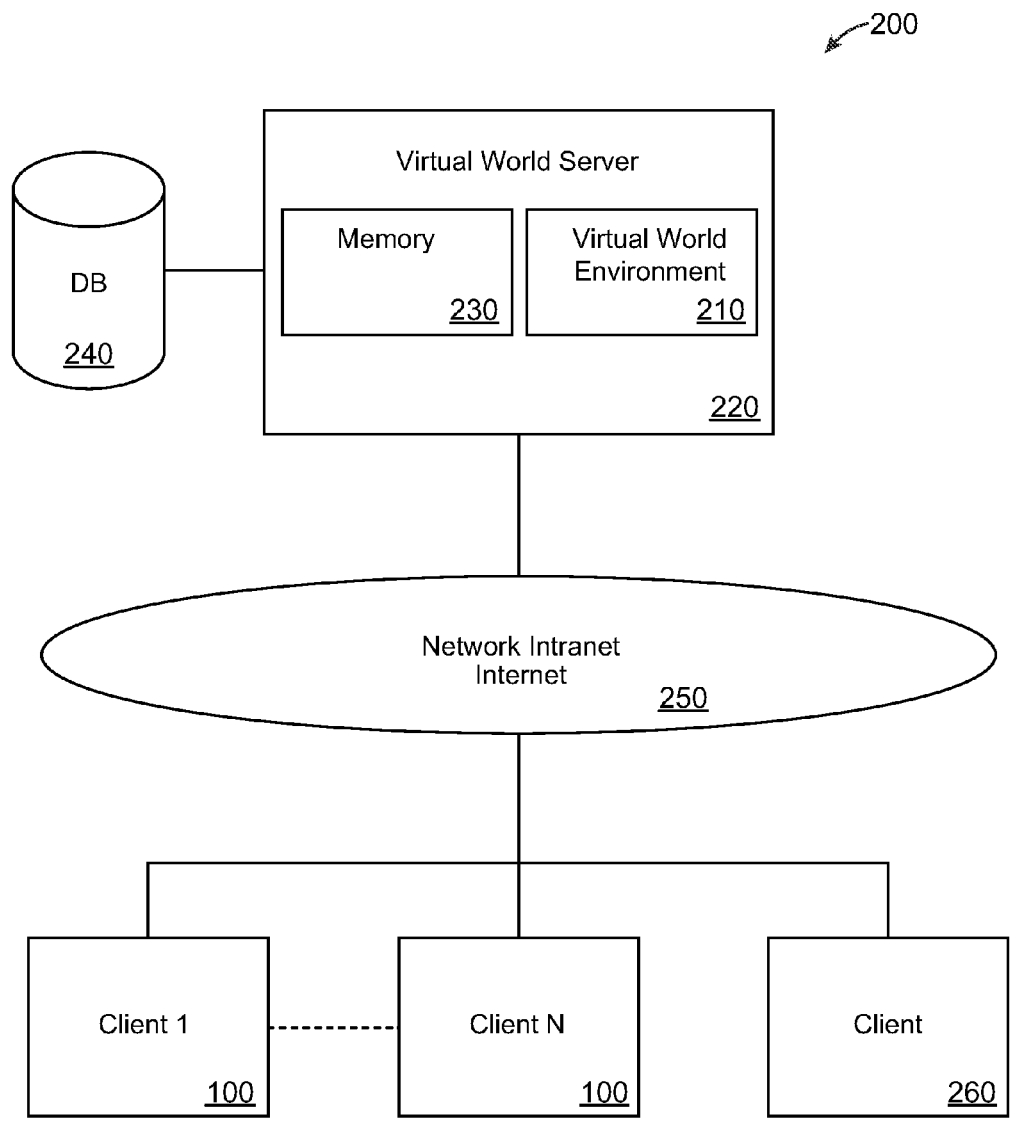
FIG. 2 illustrates a virtual world system according to an embodiment of the invention.

FIG. 2 illustrates a virtual world environment system 200. System 200 includes a virtual world environment 210 running on a virtual world server 220 having a memory 230 and connected with a database 240, a network/Intranet/Internet 250, clients 1-N 100, and at least one client 260 not including hardware/software for storing virtual world information locally.

In one embodiment, a user using a client 100, can create virtual world environment information locally on client 100, and transmit the information to the virtual world environment 210 temporarily or permanently. Typically, user virtual world environment information is stored on database 240 and in memory 230 for clients 260. If a client 260 installs either hardware or software to provide the user with a means for storing virtual world environment information locally on the client, and also providing the capability of restoring the information selectively, the client 260 can become a client 100 device.

By storing virtual world environment information in a local memory, the user gains security from a host of the virtual world server 220, personnel having access to the database 240 and memory 230, hackers, etc. The user can then control the security where the virtual world environment information is stored. For example, the memory can be removable and stored in a secure area, such as a locked desk, a safe, etc. The device can be portable itself and stored securely. The memory can have a password associated with it. A program running the local create/store/restore functions can be password protected.

Figure 3:
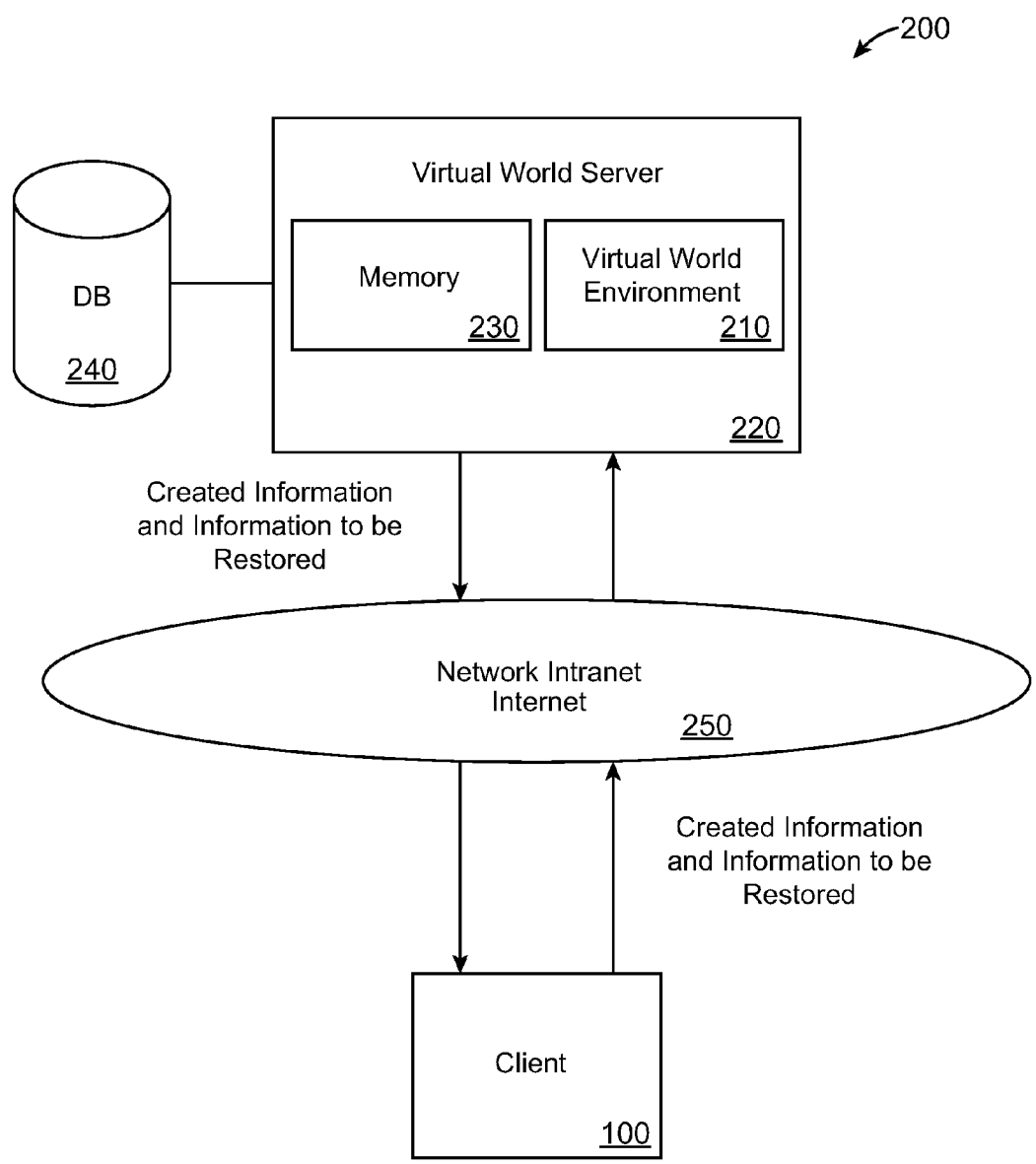
FIG. 3 illustrates information flow in a virtual world system according to an embodiment of the invention.

FIG. 3 illustrates a flow of information to/from the virtual world server from/to the client 100. As illustrated, virtual world environment information can be created locally on client 100 or externally in the virtual world environment. The virtual world environment information created locally on client 100 is transmitted through the network/Intranet/Internet 250 to the memory 230. If further virtual world environment information is created in the virtual world environment 210, this virtual world environment information along with the virtual world environment information created locally can be selectively chosen by a user to be stored locally on client 100. In this case, the virtual world environment information is transmitted through the network/Intranet/Internet 250 to the client 100. For a restore, the virtual world environment information selectively chosen for a particular type of restore is transmitted through the network/Intranet/Internet 250 to the memory 230 and to the virtual world environment 210.

Figure 4:
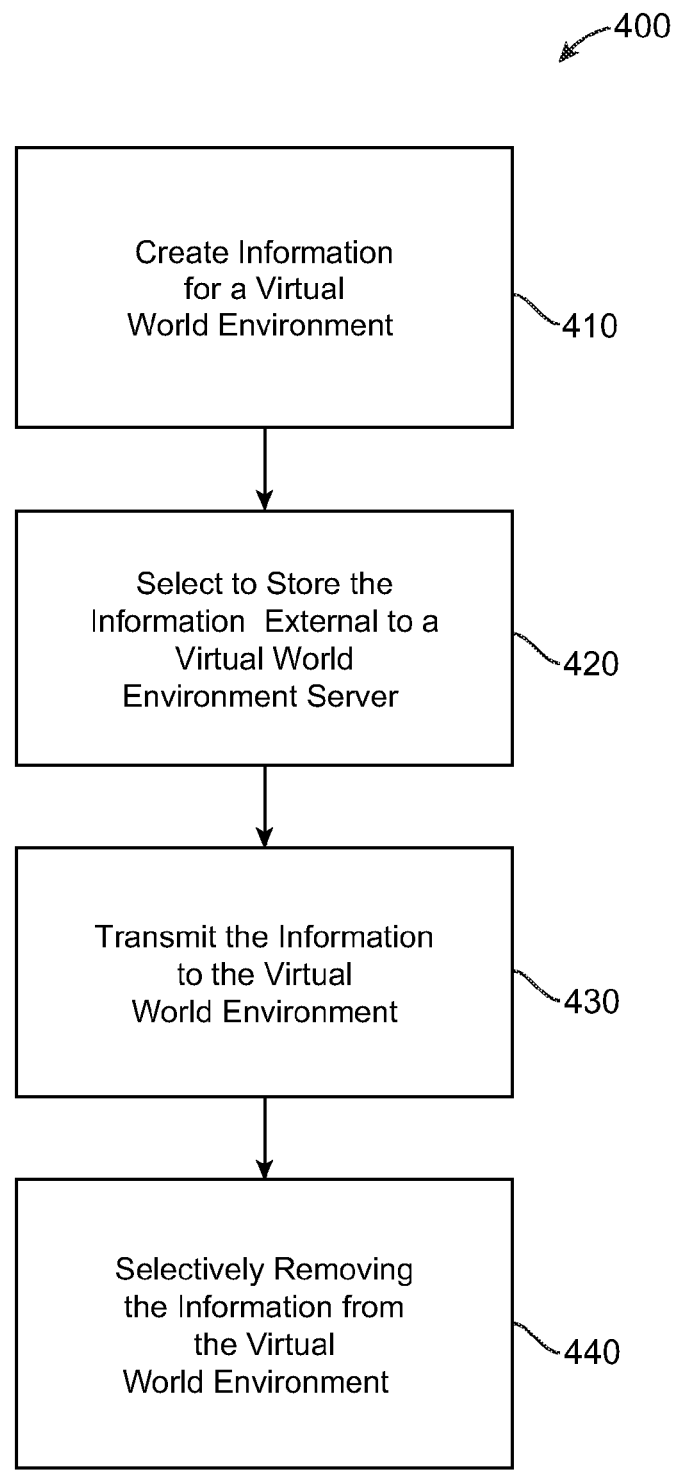
FIG. 4 illustrates a block diagram of a process for securing information in a virtual world environment according to an embodiment of the invention.

FIG. 4 illustrates a block diagram of process 400 which provides securing virtual world environment information according to one embodiment. In block 410, virtual world environment information is created by a user locally on a client, such as client 100, creates virtual world environment information in the virtual world environment, or the information is created by the user's activity, activities of other virtual world environment users, the virtual world environment information is generated by the virtual world environment or from other sources (e.g., RSS feeds).

In block 420, a user selects where to store the virtual world environment information. In this embodiment, the user can select to store all or part of the virtual world environment information locally, such as on client 100. It should be noted that in other embodiments, a user can select to store the virtual world environment information on a third party site, such as a secure storage facility.

In block 430, virtual world environment information created locally on a client 100 or previously created from the virtual world environment and stored locally is transmitted to the virtual world environment from the local memory of a device, such as client 100. In another embodiment, the virtual world environment information can be transmitted from a third party secured storage to the virtual world environment.

In block 440, virtual world environment information is selectively removed from the virtual world environment and stored locally on a device, such as device/client 100 or a secure third party storage facility. When the virtual world environment information is removed from the virtual world environment, all parties with access to the virtual world environment information on the virtual world environment server cannot access the virtual world environment information. It should also be noted that the virtual world environment information that is not permanently stored on the virtual world environment server or an associated database cannot be saved, backed up or copied by the host or personnel associated with the virtual world environment server.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element.

If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for securing information for a virtual world environment running on a server, the method comprising:
   creating information for a virtual world environment, the information comprising personal user information;
   selectively storing one or more portions of the information on a first selected memory location that is local to the server or a selected second memory location that is external to the server, wherein storing a portion of information on the second memory location that is external to the server prevents access from the server; and
   selectively removing one or more portions of the information from the virtual world environment based on a separate user selected memory location for each one of the one or more portions of the information.

2. The method of claim 1, wherein the one or more portions of the information are stored in different memory locations from one another.

3. The method of claim 2, wherein the information is created either external to the virtual world environment or within the virtual world environment.

4. The method of claim 1, wherein information is created by a user, created by user activity in the virtual world environment and created by other users in the virtual world environment, wherein the information further comprising private user information.

5. The method of claim 1, further comprising:
   transmitting the created information to the virtual world environment from the second memory external to the server.

6. The method of claim 5, further comprising:
   selectively grouping information based on a group type;
   pre-selecting a type of restoration; and
   selectively restoring the information to the virtual world environment based on the group type and pre-selected type of restoration.

7. The method of claim 5, wherein the information is restored based on the pre-selected type of restoration comprising upon a user logging on to the virtual world environment or based on the pre-selected type of restoration comprising upon an avatar of a user being proximal to a specific location in the virtual world environment.

8. The method of claim 7, wherein the information comprises information generated by interaction between users.

9. A system for securing virtual world information, comprising:
   a client device that connects to a virtual world environment, the client device including:
      an information creation module that creates information for the virtual world environment, the information comprising personal user information;
      a first memory that stores selected one or more portions of the information external to the virtual world environment; and
      a second memory that stores selected one or more portions of the information local to the virtual world environment, wherein one or more portions of the information is selectively stored on the first memory or the second memory, wherein storing a portion of information on the first memory external to the virtual world environment prevents access from the virtual world environment, and wherein the client device selectively removes the information from the virtual world environment based on a user pre-selected memory location for one or more portions of the information.

10. The system of claim 9, wherein the information is created by a user, created by user activity in the virtual world environment and created by other users in the virtual world environment, wherein the information further comprises shared user information.

11. The system of claim 10, further comprising:
a transmit module that transmits the information to and from the virtual world environment; and
a restore module that selectively restores the one or more portions of the information to the virtual world environment from one or more of the first memory and the second memory.

12. The system of claim 11, wherein the restore module restores the information based on a pre-selected type of restoration based one of a user logging on to the virtual world environment or an avatar of a user being proximal to a specific location in the virtual world environment.

13. The system of claim 11, wherein the restore module restores the information based on grouping of the information and based on a pre-selected type of restoration.

14. A computer program product for securing virtual world information comprising a computer readable storage device having program code embodied therewith, the program code executable by a processor to:
create information, by the processor, for a virtual world environment, the information comprising personal user information;
selectively store, by the processor, one or more portions of the information on a selected local memory location that is local to the virtual world environment or a selected external memory location that is external to the virtual world environment, wherein storing a portion of information on the memory external to the virtual world environment prevents access from the virtual world environment; and
selectively remove the information, by the processor, from the virtual world environment based on a user pre-selected memory location for one or more portions of the information.

15. The computer program product of claim 14, wherein the information is created one of in the virtual world environment and external to the virtual world environment, wherein the information further comprises private user information.

16. The computer program product of claim 15, wherein information is created by a user, created by user activity in the virtual world environment and created by other users in the virtual world environment, wherein the information further comprising purchase information or sales information.

17. The computer program product of claim 15, wherein the program code further executable by the processor to:
transmit the information, by the processor, to the virtual world environment from the external memory for the virtual world environment.

18. The computer program product of claim 17, wherein the program code further executable by the processor to:
selectively restore the information, by the processor, in the virtual world environment based on one of a pre-selected restoration type comprising a user logging on to the virtual world environment or an avatar of a user being proximal to a specific location in the virtual world environment.

19. The computer program product of claim 18, wherein the information is restored based on grouping of the information and based on the pre-selected type of restoration.

20. The computer program product of claim 19, wherein the one or more portions of the information are selectively stored in different memory locations from one another.

* * * * *